Figure 3:
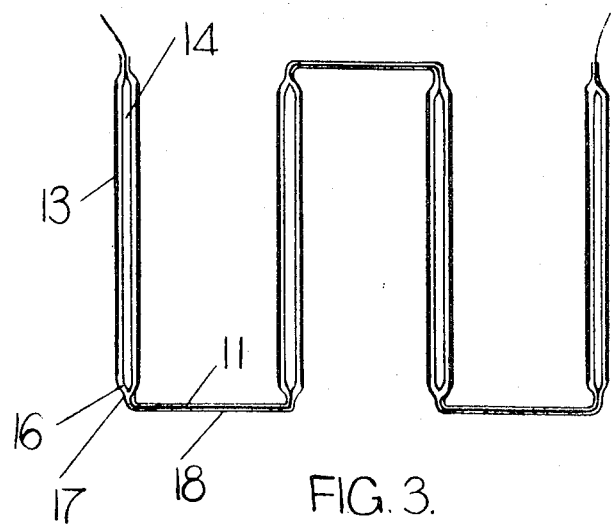

United States Patent [19]
Bennett et al.

[11] 3,772,089
[45] Nov. 13, 1973

[54] PRIMARY METAL-AIR BATTERIES

[75] Inventors: Derek Roger Bennett, Sutton Coldfield; Gordon John Shotton, Birmingham, both of England

[73] Assignee: Joseph Lucas (Industries) Limited, Birmingham, England

[22] Filed: Nov. 18, 1971

[21] Appl. No.: 200,063

[30] Foreign Application Priority Data
Nov. 21, 1970 Great Britain.................. 55,519/70

[52] U.S. Cl.................. 136/175, 136/83, 136/86 A
[51] Int. Cl.......................................... H01m 31/00
[58] Field of Search.................... 136/6, 83 R, 86 A, 136/86 R, 111, 132, 133; 156/73

[56] References Cited
UNITED STATES PATENTS
3,239,380   3/1966   Berchielli............................. 136/6
3,479,225   11/1969  Chodosh et al..................... 136/86 A
3,533,845   10/1970  Katsoulis........................... 136/86 A
3,594,234   7/1971   Lang et al.......................... 136/86 A
3,594,235   7/1971   Moran ............................... 136/86 A
3,494,796   2/1970   Grulke et al....................... 136/83 R

*Primary Examiner*—A. B. Curtis
*Assistant Examiner*—H. A. Feeley
*Attorney*—Holman & Stern

[57]    ABSTRACT

A cell for a primary metal-air battery comprises a pair of electrically interconnected air electrodes positioned on opposite sides respectively of a metal anode and insulated therefrom. Each air electrode includes catalyst material supported on a sheet of porous material and the sheet of porous material are joined together at their peripheries to form a cell compartment including the air electrodes and the anode.

2 Claims, 3 Drawing Figures

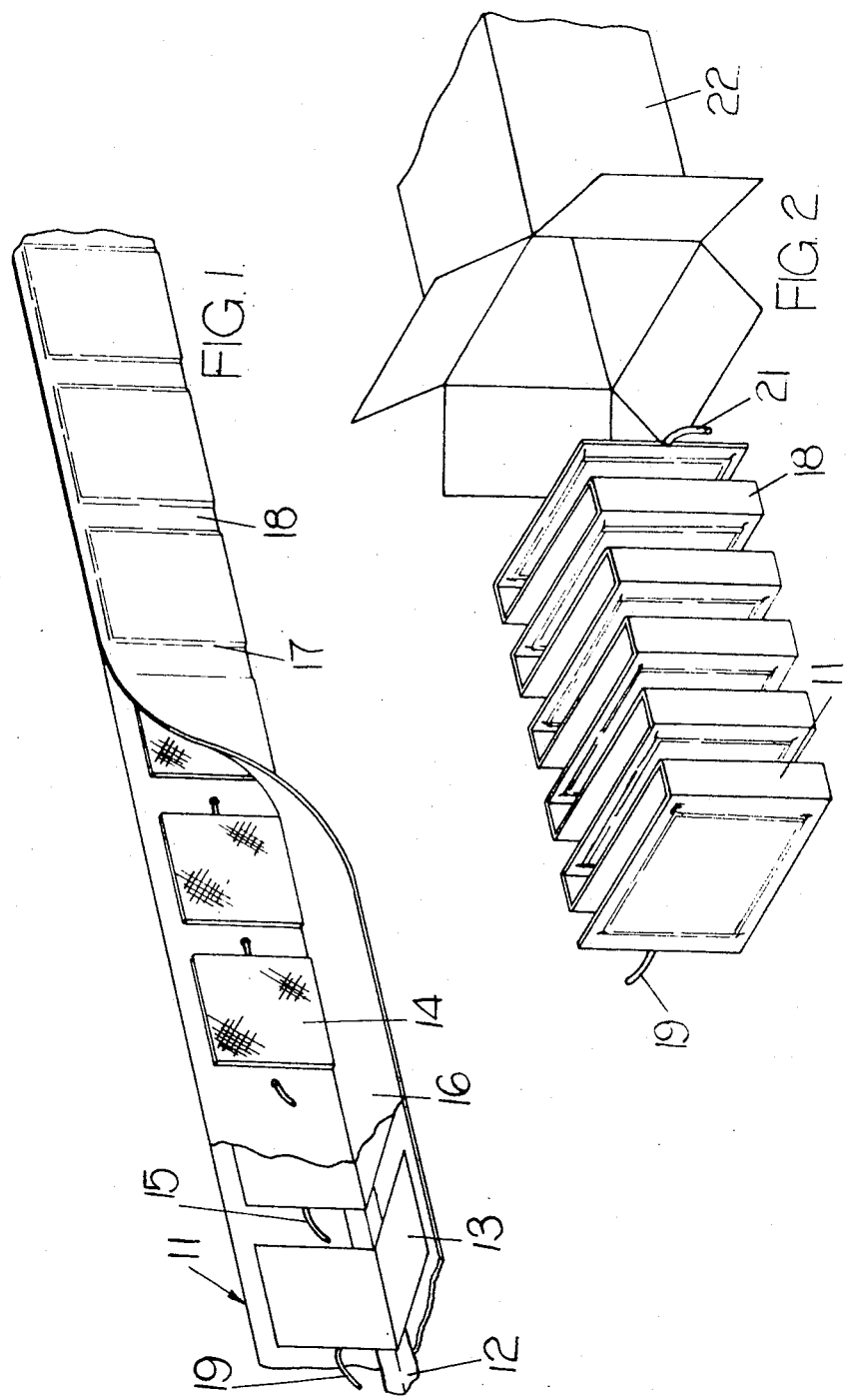

PRIMARY METAL-AIR BATTERIES

This invention relates to primary metal-air batteries.

In one aspect, the invention resides in a cell for a primary metal-air battery wherein the cell comprises a pair of electrically interconnected air electrodes positioned on opposite sides respectively of a metal anode and being insulated therefrom, each air electrode including catalyst material supported on a sheet of porous material, and the sheets of porous material being joined together at the peripheries thereof to form a cell compartment including said air electrodes and said anode.

Conveniently, said sheets of porous material are constituted by respective parts of a single strip of said porous material, said strip being folded to allow said sheets to be joined together at their peripheries.

It is to be appreciated that in the cell described above the sheets of porous material can be joined together by any convenient means including the use of an adhesive, or by welding where the porous material is weldable, or, where a weldable material is provided between the porous sheets, by a method as described below, although we specifically disclaim a method wherein the sheets of porous material are joined together by way of a rigid support member.

The invention further resides in a primary metal-air battery comprising a plurality of cells, each cell including a pair of electrically interconnected air electrodes positioned on opposite sides respectively of a metal anode and insulated therefrom, and each air electrode including catalyst material supported on a porous substrate, characterised in that the substrate of each air electrode forms part of a strip of a porous material arranged so that adjacent cells of the battery are joined together by said strip.

Preferably, the strip is folded intermediate adjacent cells so that in the battery the cells are positioned in parallel, spaced relationship with adjacent cells being joined together by regions of the strip positioned at alternate ends of the cells.

Preferably, said strip is formed from polytetrafluoroethylene

The invention still further resides in a method of manufacturing a primary metal-air battery comprising the steps of starting with a strip of porous material, applying areas of catalyst material to the strip on both sides of the longitudinal centre line of the strip and at intervals along the strip, each area of catalyst material defining part of an air electride in the finished battery, providing a porous, insulating material over each of said areas of catalyst material, positioning an anode on the insulating material between each pair of adjacent catalyst areas on opposite sides of the longitudinal centre line of the strip, folding the strip along said centre line so that each metal anode is positioned between and insulated from a pair of catalyst areas supported by the strip, and forming a seal between the folded portions of the strip around each of said metal anodes so as to define a plurality of individual cells joined together by the strip.

Conveniently, the method includes the further step of cutting through the regions of the strip joining together adjacent cells so as to form a plurality of separate, individual cells.

Preferably, said strip of porous material is non-conductive and conductive material as well as the catalyst material is applied to the strip at intervals along the strip.

Conveniently, said porous, insulating material is in the form of a further strip.

Preferably, the seal is formed by ultrasonic welding.

Most preferably, said first mentioned strip of porous material is polytetrafluoroethylene and said insulating material is arranged to melt during the ultrasonic welding operation so as to enable the formation of a satisfactory seal between said folded portions of the p.t.f.e. strip.

FIG. 1 is a diagrammatic illustration of a number of stages during the manufacture of a metal-air battery by a method according to one example of the invention, FIG. 2 is a diagrammatic illustration of a later stage during the method shown in FIG. 1, and FIG. 3 is a sectional view showing the arrangement of the cells in FIG. 2.

Referring to the drawings, in one example of the invention a metal-air battery is manufactured by starting with a strip 11 of micro-porous p.t.f.e. and placing on the strip 11 a narrow band 12 of a random-fibre polyamide material, as sold under the trade name BONDINA, so that the band 12 extends parallel to and on both sides of the longitudinal centre line of the strip. A layer 13 of catalyst material together with a conductive material is then applied to the strip 11 at intervals along the strip so as to extend transversely across the longitudinal centre line of the strip. Each of the layers 13 defines part of a pair of electrically interconnected air electrodes, which in the finished battery form together with a metal anode 14, a cell of the battery. A lead 15 is connected to the conductive material in each of the layers 13, the lead 15 providing in use an electrical connection to the pair of air electrodes defining each cell of the battery. A further strip 16 of porous, insulating material, preferably being the polyamide material sold under the trade name BONDINA, is then placed over the strip 11 on top of the catalyst areas 13, the dimensions of the strip 16 being substantially similar to the dimensions of the strip 11. The metal anodes 14 are now positioned on the strip 16 so that each anode 14 is situated adjacent a layer 13 and is electrically connected by way of a lead 15 to the pair of electrically interconnected air electrodes in the following cell. The strip 11 is then folded about its longitudinal centre line so that each of the anodes 14, is trapped between portions of the insulating strip 16 with a region of the respective catalyst layer 13 being positioned on opposite sides of the anode 14.

A liquid tight seal is then formed between the folded portions of the strip 11 around each of the metal anodes 14, the seal being formed by ultrasonically welding around three sides of each of the anodes as shown by the dotted line indicated at 17 in FIG. 1. If desired, a double seal may be formed around the three sides of each of the anodes 14. The inherent difficulty of forming a satisfactory joint between two sheets of porous p.t.f.e. is well-known, but in the present method this difficulty is overcome because the material of the sheet 16 is chosen so that during the ultrasonic welding operation the material melts and flows into the pores of the p.t.f.e. sheet 11, whereby on cooling the required liquid tight seal is formed.

After the sealing operation, as shown in FIG. 1, there is produced a plurality of individual cells interconnected by portions 18 respectively of the strip 11. Each of the cells is electrically connected to each of its adjacent cells by means of a lead 15, the lead 15 extending from the layer 13 of one cell through the insulating strip 16 and between the sealed regions of the strip 11 defining an interconnecting portion 18 into electrical connection with the anode 14 of the adjacent cell. At the end cells of the strip the respective leads 15 extend through the strip 11 to define negative and positive leads 21, 19, respectively for connection to the terminals (not shown) respectively of the battery. To insert the cells into a battery casing 22, the strip 11 is bent back upon itself intermediate each of the cells whereby the cells are arranged in parallel, spaced relationship with adjacent cells being interconnected by portions 18 of the strip 11 positioned at alternate ends of the cells. The cells are then inserted into the battery case 22 which is provided with ventilation holes to allow air access to the air electrodes in use. Activation of the cells can be achieved either by including a gelled electrolyte in the cell during manufacture or by leaving a small gap in the joint at the top of each cell so that electrolyte can subsequently be injected into the cells. The gap in the joint at the top of each cell is conveniently provided by placing a removable pin (not shown) on the strip 16 adjacent each anode before the sealing operation so that the pin extends beyond the edge of the strips 11, 16. The pins are then removed after the seal has been formed so as to leave the required gaps for the injection of electrolyte.

It will be appreciated that materials other than p.t.f.e. could be used to form the strip 11 in the above example, in which case the strip 16 might not be required to be formed of a material which will aid the production of a seal between the folded portions of the strip 11. Moreover, welding methods other than ultrasonic welding can be used to form the seal. Furthermore, where a non-weldable material is used as the strip 11 a material other than that constituting the separator could be used to melt and effect the required seal, although it is most convenient to use the continuous strip 16 of separator material for this purpose.

It is also to be appreciated that separate, individual cells can be produced by the method described above. Conveniently, the separate cells are produced by forming a single seal between adjacent cells on the strip 11, the seal being of sufficient width to allow the folded strip 11 to be cut along the centre line of each seal to separate the strip and form a plurality of separate, individual cells. Each of the leads 15 which electrically interconnects a pair of adjacent cells in the joined strip 11 is arranged to extend through the single seal between said pair of cells parallel to the fold in the strip 11. The cutting of the strip 11 can then be arranged so that the separated cells are still electrically interconnected through the leads 15, or alternatively where the interconnections are broken, the separated cells can be electrically interconnected after assembly in a battery case.

Finally, it is to be appreciated that, if desired, single cells can be produced individually by using a pair of sheets or a single folded sheet of porous material on which catalyst material is supplied and then joining the sheets or the folded portions of the sheet at their peripheries so as to trap a metal anode therebetween and form a single cell compartment including a pair of electrically interconnected air electrodes and the metal anode.

We claim:

1. A method of manufacturing a primary metal-air battery, comprising the steps of starting with a porous polytetrafluoroethylene strip, applying areas of catalyst material to the strip on both sides of the longitudinal centreline of the strip and at intervals along the strip, each area of catalyst material defining part of an air electrode in the finished battery, providing a porous polyamide insulating material over each of said areas of said catalyst material, positioning an anode on the insulating material between each pair of adjacent catalyst areas on opposite sides of the longitudinal centreline of the strip, folding the strip along said centreline so that each metal anode is positioned between and is insulated from a pair of catalyst areas supported by the strip, and performing an ultrasonic welding operation on the folded portions of the strip whereby the insulating material melts and flows into the pores of the polytetrafluoroethylene strip so as to form a seal between the folded portions of the strip around each of said metal anodes and thereby define a plurality of individual cells joined together by the strip.

2. A method as claimed in claim 1 and further including the step of cutting through the regions of the strip joining together adjacent cells so as to form a plurality of separate, individual cells.

* * * * *